(12) United States Patent
Ikeuchi

(10) Patent No.: US 11,081,708 B2
(45) Date of Patent: Aug. 3, 2021

(54) REDOX FLOW BATTERY

(71) Applicant: Sumitomo Electric Industries, Ltd., Osaka (JP)

(72) Inventor: Atsuo Ikeuchi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 61 days.

(21) Appl. No.: 16/060,286

(22) PCT Filed: Nov. 28, 2017

(86) PCT No.: PCT/JP2017/042652
§ 371 (c)(1),
(2) Date: Jun. 7, 2018

(87) PCT Pub. No.: WO2019/106723
PCT Pub. Date: Jun. 6, 2019

(65) Prior Publication Data
US 2019/0237780 A1    Aug. 1, 2019

(51) Int. Cl.
*H01M 8/04186* (2016.01)
*H01M 8/04082* (2016.01)
(Continued)

(52) U.S. Cl.
CPC ... *H01M 8/04186* (2013.01); *H01M 8/04082* (2013.01); *H01M 8/04201* (2013.01); *H01M 8/04753* (2013.01); *H01M 8/188* (2013.01)

(58) Field of Classification Search
CPC .......... H01M 8/04201; H01M 8/04753; H01M 8/188; H01M 8/18–20; H01M 8/1009–1013; H01M 8/04186
See application file for complete search history.

(56) References Cited

U.S. PATENT DOCUMENTS

| 2008/0220318 A1* | 9/2008 | Brereton | H01M 8/188 429/71 |
| 2011/0300417 A1* | 12/2011 | Mou | H01M 8/04201 429/50 |
| 2016/0006051 A1* | 1/2016 | Winter | H01M 8/188 429/418 |

FOREIGN PATENT DOCUMENTS

| EP | 2541660 A1 | 1/2013 |
| EP | 3240083 A1 * | 11/2017 ........ H01M 8/04186 |

(Continued)

OTHER PUBLICATIONS

JP-H04124754-U translation (Year: 2019).*
JP-2006147375-A translation (Year: 2019).*

*Primary Examiner* — Ula C Ruddock
*Assistant Examiner* — Armindo Carvalho, Jr.
(74) *Attorney, Agent, or Firm* — Baker Botts L.L.P.; Michael A. Sartori

(57) ABSTRACT

A redox flow battery includes a battery cell; a positive electrolyte tank and a negative electrolyte tank configured to store therein a positive electrolyte and a negative electrolyte, respectively; a positive electrolyte circulation path and a negative electrolyte circulation path each configured to allow a corresponding one of the electrolytes to circulate between a corresponding one of the tanks and the battery cell; and a communicating tube including a tube immersed at one open end thereof in the positive electrolyte, stretched at an intermediate portion thereof above levels of both the electrolytes, and immersed at the other open end thereof in the negative electrolyte.

7 Claims, 5 Drawing Sheets

(51) Int. Cl.
*H01M 8/04746* (2016.01)
*H01M 8/18* (2006.01)

(56) References Cited

FOREIGN PATENT DOCUMENTS

| JP | H04124754 U | * | 11/1992 | |
|----|----|----|----|----|
| JP | 2006147375 A | * | 6/2006 | ............. H01M 8/18 |
| JP | 2013-025964 A | | 2/2013 | |
| JP | 2013-037814 A | | 2/2013 | |

* cited by examiner

REDOX FLOW BATTERY

TECHNICAL FIELD

The present invention relates to a redox flow battery.

BACKGROUND ART

As a large-capacity storage battery, a redox flow battery (which may hereinafter be referred to as "RF battery") is known, which performs charge and discharge by circulating positive and negative electrolytes through a battery cell (see, e.g., Patent Literatures 1 and 2). The RF battery includes the battery cell, a positive electrolyte tank and a negative electrolyte tank configured to store therein a positive electrolyte and a negative electrolyte, respectively, and a positive electrolyte circulation path and a negative electrolyte circulation path each configured to allow a corresponding one of the electrolytes to circulate between a corresponding one of the tanks and the battery cell. Patent Literatures 1 and 2 each describe an RF battery that includes a communicating tube configured to allow communication between the positive electrolyte tank and the negative electrolyte tank.

CITATION LIST

Patent Literature

PTL 1: Japanese Unexamined Patent Application Publication No. 2013-25964
PTL 2: Japanese Unexamined Patent Application Publication No. 2013-37814

SUMMARY OF INVENTION

A redox flow battery of the present disclosure includes a battery cell; a positive electrolyte tank and a negative electrolyte tank configured to store therein a positive electrolyte and a negative electrolyte, respectively; a positive electrolyte circulation path and a negative electrolyte circulation path each configured to allow a corresponding one of the electrolytes to circulate between a corresponding one of the tanks and the battery cell; and a communicating tube including a tube immersed at one open end thereof in the positive electrolyte, stretched at an intermediate portion thereof above levels of both the electrolytes, and immersed at the other open end thereof in the negative electrolyte.

DESCRIPTION OF EMBODIMENTS

Figure 1:
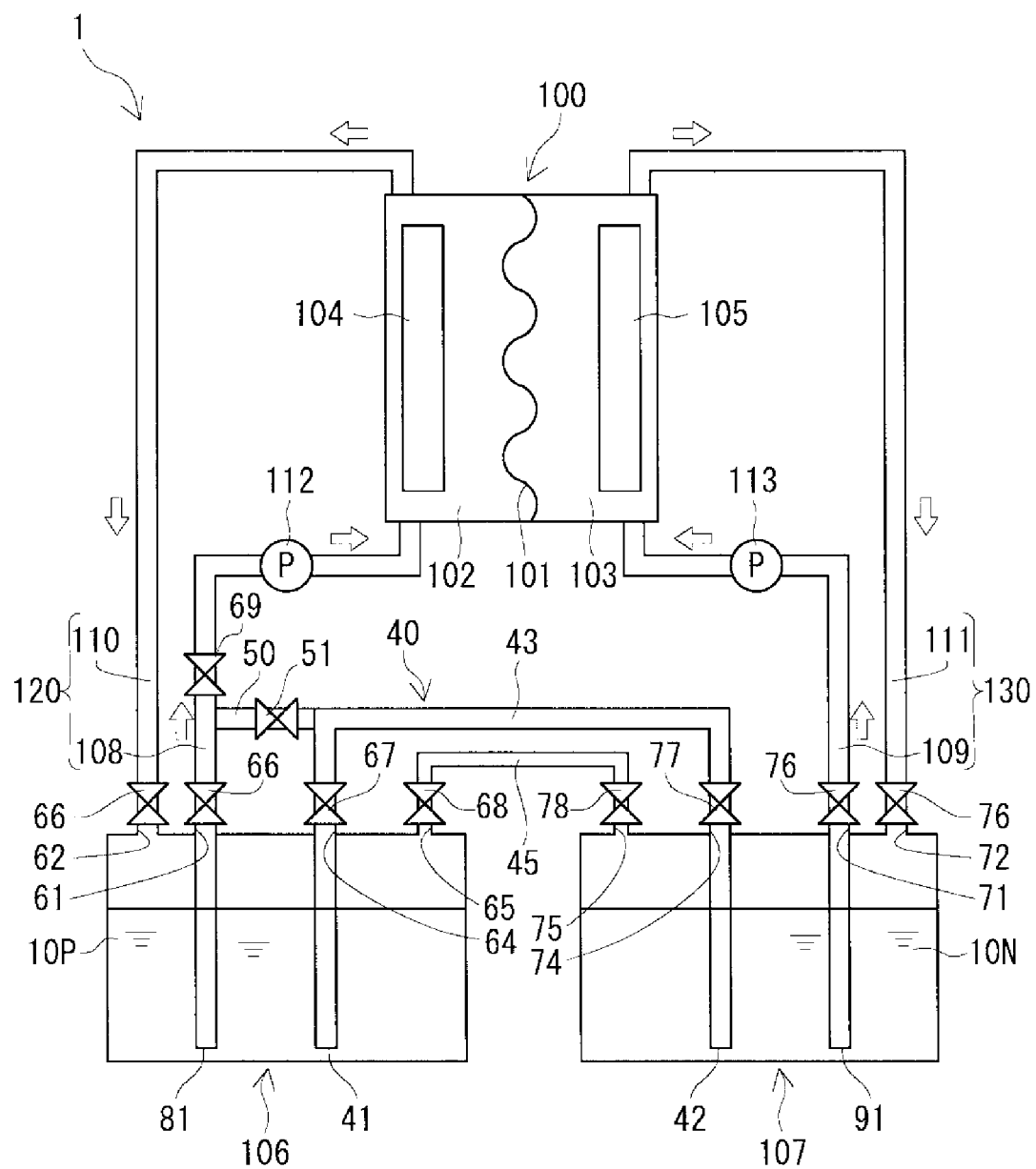
FIG. 1 is a schematic diagram of a redox flow battery according to an embodiment.

Problems to be Solved by the Present Disclosure

When charge and discharge cycles are repeated during operation of a redox flow battery (RF battery), a phenomenon called "electrolyte crossover" may occur, in which positive and negative electrolytes are each transferred from one side to the other through a membrane interposed between a positive electrode and a negative electrode inside a battery cell. This may create a difference between the volumes of the electrolytes in a positive electrolyte tank and a negative electrolyte tank and lead to reduced battery capacity (discharge capacity).

As a solution to such problems associated with the electrolyte crossover, Patent Literatures 1 and 2 each disclose a technique in which the positive electrolyte tank and the negative electrolyte tank are connected by a communicating tube and when a difference occurs between the volumes of the electrolytes in the tanks, the levels of the electrolytes in the tanks are adjusted to the same height using the communicating tube. In the techniques disclosed in Patent Literatures 1 and 2, however, the communicating tube is connected and positioned at a level substantially the same as, or lower than, the levels of the electrolytes in the tanks. This may cause electrolyte to leak through a connection of each tank with the communicating tube, or may cause electrolyte to flow out of the communicating tube in the event of breakage of the communicating tube.

Accordingly, the present disclosure aims to provide a redox flow battery that is capable not only of adjusting the volumes of the electrolytes in the positive electrolyte tank and the negative electrolyte tank, but also of preventing each electrolyte from flowing out of the tank.

Advantageous Effects of the Present Disclosure

The present disclosure provides a redox flow battery that is capable not only of adjusting the volumes of the electrolytes in the positive electrolyte tank and the negative electrolyte tank, but also of preventing each electrolyte from flowing out of the tank.

DESCRIPTION OF EMBODIMENT OF THE INVENTION OF THE PRESENT APPLICATION

First, aspects of an embodiment of the invention of the present application will be listed.

(1) A redox flow battery according to an aspect of the invention of the present application includes a battery cell; a positive electrolyte tank and a negative electrolyte tank configured to store therein a positive electrolyte and a negative electrolyte, respectively; a positive electrolyte circulation path and a negative electrolyte circulation path each configured to allow a corresponding one of the electrolytes to circulate between a corresponding one of the tanks and the battery cell; and a communicating tube including a tube immersed at one open end thereof in the positive electrolyte, stretched at an intermediate portion thereof above levels of both the electrolytes, and immersed at the other open end thereof in the negative electrolyte.

In the redox flow battery described above, the one and other open ends of the communicating tube are immersed in the positive electrolyte and the negative electrolyte, and the intermediate portion of the communicating tube is stretched above the levels of both the electrolytes. The communicating tube becomes a siphon by being filled with electrolyte. Then, when a difference occurs between the volumes of the electrolytes in the tanks, the levels of the electrolytes are adjusted to the same height through the communicating tube using the siphon principle. The volumes of the electrolytes are thus automatically adjusted to maintain the levels of the electrolytes in the tanks. If the communicating tube is broken, the resulting entry of air into the communicating tube terminates the siphon. As described above, the intermediate portion of the communicating tube is disposed above the levels of both the electrolytes. Therefore, even in the event of breakage, the electrolyte in the communicating tube is returned to either of the tanks by termination of the siphon. That is, even if the communicating tube is broken, the electrolyte in the communicating tube is prevented from flowing out of the tank. The redox flow battery described above is thus capable not only of adjusting the volumes of the electrolytes in the positive electrolyte tank and the negative electrolyte tank, but also of preventing each electrolyte from flowing out of the tank.

(2) Another aspect of the redox flow battery may include an introducing tube configured to connect at least one of the positive electrolyte circulation path and the negative electrolyte circulation path to the communicating tube, and an open-close valve configured to open and close the introducing tube.

To serve as a siphon, the communicating tube needs to be filled with electrolyte. In this aspect of the redox flow battery, which includes the introducing tube, the electrolyte is introduced through the introducing tube into the communicating tube when the redox flow battery starts, and this allows the communicating tube to be filled with the electrolyte. Also, with the open-close valve, a siphon can be created when the open-close valve closes the introducing tube to block the flow between the circulation path and the communicating tube, with the communicating tube being filled with the electrolyte.

(3) In another aspect of the redox flow battery, the open ends of the communicating tube may each be located on a bottom side in a corresponding one of the tanks.

Entry of a gas into the communicating tube may terminate the siphon. Gas bubbles may be produced in the vicinity of the surface of the electrolyte in each tank. Therefore, if an open end of the communicating tube is located near the surface of the electrolyte in the tank, gas bubbles are easily drawn in through the open end. In this aspect of the redox flow battery, where each open end of the communicating tube is located on the bottom side in the tank, gas bubbles are not easily drawn in through the open end. This makes it easier to keep the communicating tube in a siphon state.

(4) In another aspect of the redox flow battery, the open ends of the communicating tube may be formed to face upward.

In this aspect of the redox flow battery, where the open ends of the communicating tube are formed to face upward, gas bubbles are not easily drawn in through the open ends. This also makes it easier to keep the communicating tube in a siphon state.

(5) In another aspect of the redox flow battery, the communicating tube may be provided with a flow control valve.

In this aspect of the redox flow battery, where the communicating tube is provided with a flow control valve, it is possible to control, with the flow control valve, the flow rate (or the amount of transfer) of the electrolyte passing through the communicating tube when the volumes of the electrolytes in the tanks are adjusted through the communicating tube using the siphon principle.

(6) Another aspect of the redox flow battery may include a gas vent pipe configured to allow gas bubbles to escape from inside the communicating tube, and the gas vent pipe may be connected at one end thereof to the communicating tube and connected at the other end thereof to at least one of the positive electrolyte circulation path and the negative electrolyte circulation path.

In this aspect of the redox flow battery, which includes the gas vent pipe, gas bubbles accumulated in the communicating tube can be discharged through the gas vent pipe to the circulation path. This makes it possible to keep the communicating tube in a siphon state.

DETAILS OF EMBODIMENT OF THE INVENTION OF THE PRESENT APPLICATION

Examples of a redox flow battery (RF battery) according to an embodiment of the invention of the present application will now be described with reference to the drawings. The same reference numerals in the drawings denote the same or corresponding parts. The invention of the present application is not limited to the examples described below, and is defined by the appended claims. All changes that fall within meanings and scopes equivalent to the claims are therefore intended to be embraced by the claims.

<RF Battery>

An RF battery according to the embodiment is typically connected through an AC/DC converter to an electric system and performs charge and discharge. The charge and discharge process involves using a positive electrolyte and a negative electrolyte each containing, as active materials, metal ions whose valences are changed by oxidation-reduction. The charge and discharge process is performed using a difference between the oxidation-reduction potential of the ions contained in the positive electrolyte and the oxidation-reduction potential of the ions contained in the negative electrolyte.

An RF battery 1 according to the embodiment will now be described with reference to FIGS. 1 and 2. As illustrated in FIG. 1, the RF battery 1 of the embodiment includes a battery cell 100, a positive electrolyte tank 106 and a negative electrolyte tank 107, and a positive electrolyte circulation path 120 and a negative electrolyte circulation path 130. A feature of the RF battery 1 is that it includes a communicating tube 40 for an adjustment which is made using the siphon principle such that electrolytes 10P and 10N stored in the positive electrolyte tank 106 and the negative electrolyte tank 107, respectively, have the same level. Hereinafter, the configuration of the RF battery 1 will be described in detail.

(Battery Cell)

As illustrated in FIG. 1, the battery cell 100 includes a positive electrode 104, a negative electrode 105, and a membrane 101 interposed between the electrodes 104 and 105, and a positive electrode cell 102 and a negative electrode cell 103 are formed with the membrane 101 therebetween. The membrane 101 is, for example, an ion-exchange membrane that allows hydrogen ions to pass therethrough. The battery cell 100 (i.e., the positive electrode cell 102 and the negative electrode cell 103) has the positive electrolyte circulation path 120 and the negative electrolyte circulation path 130 connected thereto, and allows the positive electrolyte 10P and the negative electrolyte 10N to circulate therethrough. The electrolytes 10P and 10N may be ones that contain, as active materials, metal ions of the same type. For example, the electrolytes 10P and 10N may each be an electrolyte containing vanadium ions, an electrolyte containing either manganese ions or titanium ions, or an electrolyte containing both manganese ions and titanium ions.

The battery cell 100 may be configured either as a single cell including one battery cell 100, or as a multicell including a plurality of battery cells 100. In the case of a multicell, a structure called a cell stack 2 (see FIG. 2) is used, which is formed by stacking a plurality of battery cells 100. The cell stack 2 includes a substack 200 sandwiched on both sides by two end plates 220, which are fastened with a fastening mechanism 230 (see the lower part of FIG. 2). FIG. 2 illustrates a structure including a plurality of substacks 200. The substacks 200 are each formed by sequentially stacking a cell frame 3, the positive electrode 104, the membrane 101, and the negative electrode 105 in layers (see the upper part of FIG. 2) and sandwiching the resulting layered body between supply/drainage plates 210 on both sides. The number of battery cells 100 stacked in layers to form the cell stack 2 can be appropriately determined.

Figure 2:
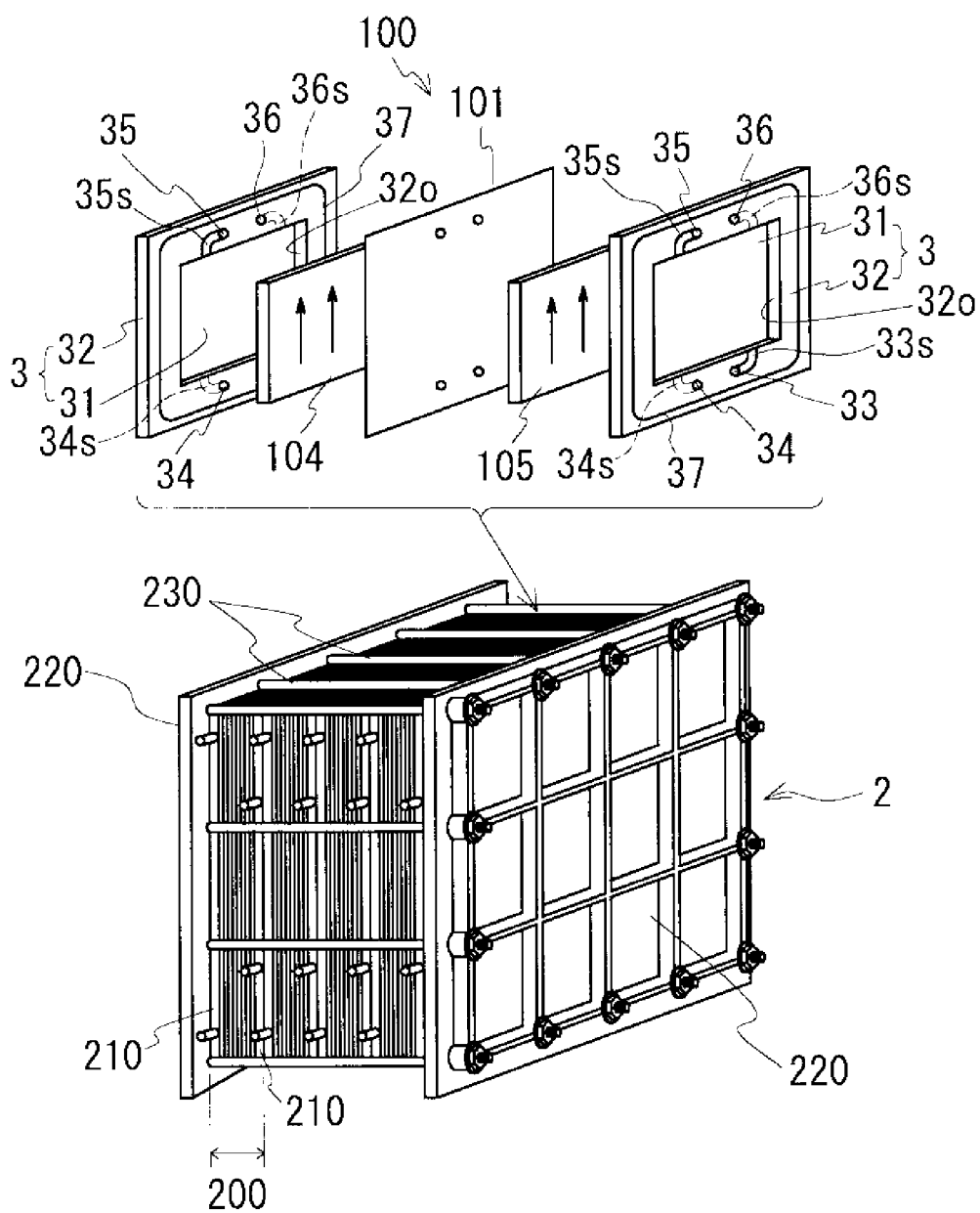
FIG. 2 is a schematic diagram of a cell stack.

As illustrated in the upper part of FIG. 2, each cell frame 3 includes a bipolar plate 31 disposed between the positive electrode 104 and the negative electrode 105, and a frame body 32 disposed around the bipolar plate 31. The positive electrode 104 is disposed on one side of the bipolar plate 31, and the negative electrode 105 is disposed on the other side of the bipolar plate 31. The bipolar plate 31 is disposed inside the frame body 32, and a recessed portion 32o is defined by the bipolar plate 31 and the frame body 32. The recessed portion 32o is provided on each side of the bipolar plate 31. The positive electrode 104 and the negative electrode 105 are housed in the respective recessed portions 32o, with the bipolar plate 31 interposed therebetween, and a first side of the frame body 32 of each cell frame 3 and a second side of the frame body 32 of an adjacent cell frame 3 are joined opposite each other. In the substack 200 (cell stack 2), the positive electrode 104 and the negative electrode 105, with the membrane 101 therebetween, are arranged between the bipolar plates 31 of adjacent cell frames 3 to form one battery cell 100. To prevent leakage of electrolyte, the frame bodies 32 of adjacent cell frames 3 are each provided with an annular sealing member 37, such as an O ring or flat gasket, therebetween.

For example, the bipolar plate 31 is made of plastic carbon, and the frame body 32 is made of plastic, such as vinyl chloride resin (PVC), polypropylene, polyethylene, fluorine resin, or epoxy resin. In this example, each cell frame 3 includes the bipolar plate 31 and the frame body 32 therearound that are integrally formed, for example, by injection molding.

The circulation of electrolyte into the battery cell 100 is made through the supply/drainage plates 210 (see the lower part of FIG. 2) and also through liquid supply manifolds 33 and 34 and liquid discharge manifolds 35 and 36 passing through the frame body 32 of each cell frame 3 (see the upper part of FIG. 2) and liquid supply slits 33s and 34s and liquid discharge slits 35s and 36s formed in the frame body 32. In the case of the cell frame 3 (frame body 32) of this example, the positive electrolyte is supplied from the liquid supply manifold 33 in the lower part of the frame body 32, through the liquid supply slit 33s on the first side of the frame body 32, to the positive electrode 104, and then discharged through the liquid discharge slit 35s in the upper part of the frame body 32 to the liquid discharge manifold 35. Similarly, the negative electrolyte is supplied from the liquid supply manifold 34 in the lower part of the frame body 32, through the liquid supply slit 34s on the second side of the frame body 32, to the negative electrode 105, and then discharged through the liquid discharge slit 36s in the upper part of the frame body 32 to the liquid discharge manifold 36. A flow-guiding portion (not shown) may be formed along the lower and upper inner edges of the frame body 32 having the bipolar plate 31 therein. The flow-guiding portions have the function of diffusing the electrolytes supplied through the liquid supply slits 33s and 34s along the lower edges of the electrodes 104 and 105, and collecting the electrolytes discharged from the upper edges of the electrodes 104 and 105 into the liquid discharge slits 35s and 36s.

(Positive Electrolyte Tank and Negative Electrolyte Tank)
As illustrated in FIG. 1, the positive electrolyte tank 106 and the negative electrolyte tank 107 store therein the positive electrolyte 10P and the negative electrolyte 10N, respectively. The tanks 106 and 107 are of the same shape and capacity. The upper part of the interior of each of the tanks 106 and 107 (i.e., upper part above the level of each of the electrolytes 10P and 10N) is a gas-phase portion. The positive electrolyte tank 106 has an outlet 61 and an inlet 62 connected to a supply pipe 108 and a return pipe 110, respectively, of the positive electrolyte circulation path 120. The negative electrolyte tank 107 has an outlet 71 and the inlet 72 connected to a supply pipe 109 and a return pipe 111, respectively, of the negative electrolyte circulation path 130. In this example, the outlets 61 and 71 and the inlets 62 and 72 are located above the levels of the electrolytes 10P and 10N in the tanks 106 and 107, or specifically, at the tops of the tanks 106 and 107. The outlet 61 and the inlet 62 are each provided with an open-close valve 66, and the outlet 71 and the inlet 72 are each provided with an open-close valve 76.

The tanks 106 and 107 have openings 64 and 74, respectively, to which the communicating tube 40 is connected. The openings 64 and 74 are disposed above the levels of the electrolytes 10P and 10N in the tanks 106 and 107. In this example, the openings 64 and 74 are located at the tops of the tanks 106 and 107. The openings 64 and 74 are provided with open-close valves 67 and 77, respectively.

(Positive Electrolyte Circulation Path and Negative Electrolyte Circulation Path)
As illustrated in FIG. 1, the positive electrolyte circulation path 120 connects the positive electrolyte tank 106 to the battery cell 100, whereas the negative electrolyte circulation path 130 connects the negative electrolyte tank 107 to the battery cell 100, thereby allowing the electrolytes 10P and 10N to circulate between the tanks 106 and 107 and the battery cell 100. The positive electrolyte circulation path 120 includes the supply pipe 108 configured to supply the positive electrolyte 10P from the positive electrolyte tank 106 to the positive electrode cell 102, and the return pipe 110 configured to return the positive electrolyte 10P from the positive electrode cell 102 to the positive electrolyte tank 106. The negative electrolyte circulation path 130 includes the supply pipe 109 configured to supply the negative electrolyte 10N from the negative electrolyte tank 107 to the negative electrode cell 103, and the return pipe 111 configured to return the negative electrolyte 10N from the negative electrode cell 103 to the negative electrolyte tank 107. The supply pipes 108 and 109 of the circulation paths 120 and 130 are connected to the outlets 61 and 71, respectively, of the tanks 106 and 107, and the return pipes 110 and 111 of the circulation paths 120 and 130 are connected to the inlets 62 and 72, respectively, of the tanks 106 and 107.

End portions of the respective supply pipes 108 and 109 are inserted through the outlets 61 and 71, respectively, into the tanks 106 and 107, and open ends 81 and 91 of these end portions are disposed below the levels of the electrolytes 10P and 10N in the tanks 106 and 107. That is, the open ends 81 and 91 of the supply pipes 108 and 109 are immersed in the electrolytes 10P and 10N, respectively, which are drawn in through the open ends 81 and 91. In this example, the open ends 81 and 91 of the supply pipes 108 and 109 are each located on the bottom side in the corresponding one of the tanks 106 and 107. Note that "located on the bottom side in the tank" refers to being located below the level of the electrolyte 10P or 10N, that is, h/2 or less from the bottom of the tank 106 or 107, where h is a height from the bottom of the tank 106 or 107 to the surface of the electrolyte 10P or 10N.

The supply pipes 108 and 109 are provided with pumps 112 and 113, respectively, configured to suck up the electrolytes 10P and 10N from the tanks 106 and 107 and pressure-feed them. During charge and discharge operation, the pumps 112 and 113 circulate the electrolytes 10P and 10N, respectively, through the battery cell 100 (i.e., the positive electrode cell 102 and the negative electrode cell 103). In standby mode where neither charge nor discharge takes place, the pumps 112 and 113 are off and the electrolytes 10P and 10N are not circulated.

(Communicating Tube) As illustrated in FIG. 1, the communicating tube 40 is a tube immersed at one open end 41 thereof in the positive electrolyte 10P, stretched at an intermediate portion 43 thereof above the levels of the electrolytes 10P and 10N, and immersed at the other open end 42 thereof in the negative electrolyte 10N. The communicating tube 40 is configured to allow liquid-phase portions in the tanks 106 and 107 to communicate with each other. The communicating tube 40 is connected to the openings 64 and 74 of the tanks 106 and 107. In this example, the communicating tube 40 is inserted at both end portions thereof through the openings 64 and 74 of the tanks 106 and 107 into the tanks 106 and 107, and the open ends 41 and 42 of both the end portions are disposed below the levels of the electrolytes 10P and 10N in the tanks 106 and 107. The intermediate portion 43 is placed above the tanks 106 and 107. In this example, the open ends 41 and 42 of the communicating tube 40 are each located on the bottom side in a corresponding one of the tanks 106 and 107.

The communicating tube 40 becomes a siphon by being filled with electrolyte. Thus, when a difference occurs between the volumes of the electrolytes 10P and 10N in the tanks 106 and 107, the levels of the electrolytes 10P and 10N are adjusted to the same height using the siphon principle. When the tube forming the communicating tube 40 (or the intermediate portion 43 in particular) is made of a transparent material, it is possible to visually recognize from the outside that the communicating tube 40 is filled with electrolyte. The intermediate portion 43 may have a window at the top (or highest portion) thereof, and the window may be made of a transparent material. Examples of the transparent material include transparent resin, such as vinyl chloride resin, and glass.

Figure 3:
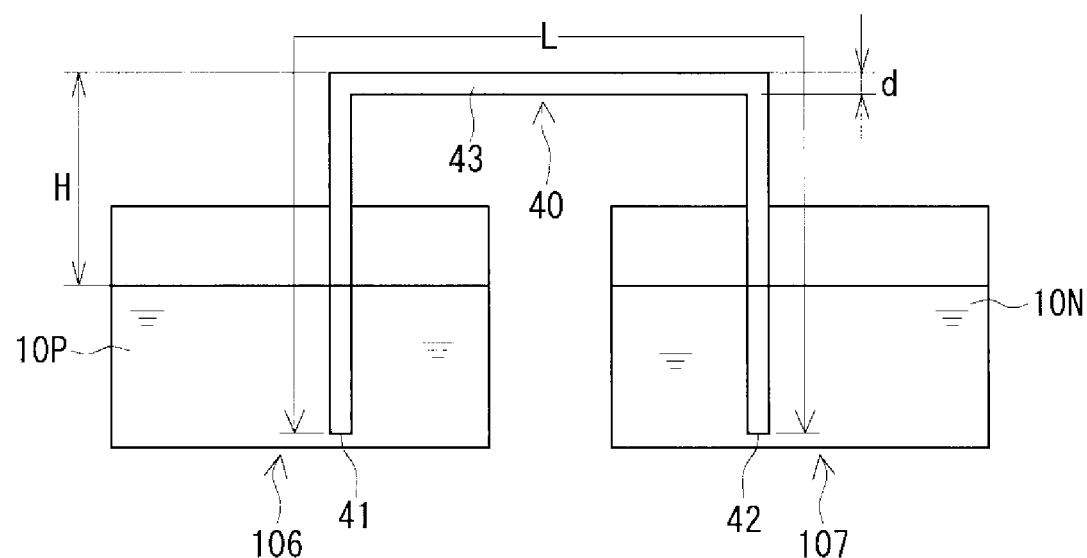
FIG. 3 illustrates dimensions of a communicating tube included in the redox flow battery according to the embodiment.

The communicating tube 40 may be appropriately designed to satisfy the siphon principle. Dimensions of the communicating tube will now be described with reference primarily to FIG. 3.

If a height H from the level of the electrolytes 10P and 10N in the tanks 106 and 107 to the top of the communicating tube 40 is too high, the transfer of electrolyte based on the siphon principle fails. The maximum height $H_{max}$ that satisfies the siphon principle is determined by the following equation:

$$H_{max} = P0/\rho \cdot g$$

where P0 (N/m$^2$) is pressure in the tank, $\rho$ (kg/m$^3$) is an electrolyte density, and g (m/s$^2$) is the acceleration of gravity.

When the pressure P0 is equal to the atmospheric pressure (1.013×10$^5$ N/m$^2$) and the electrolyte density p is 1400 kg/m$^3$, then $H_{max}$ is 7.38 m. Therefore, the installation level of the intermediate portion 43 (corresponding to the height H) is less than 7.38 m from the level of the electrolytes 10P and 10N in the tanks 106 and 107.

If a length L of the communicating tube 40 is too long, the resulting increase in frictional resistance in the communicating tube 40 leads to an increased flow friction loss and lowers the flow rate of the electrolyte passing through the communicating tube 40. This means that it takes time to adjust the electrolyte levels. The adjustment of the electrolyte levels is preferably completed within 10 minutes (or 600 seconds). Therefore, the length L of the communicating tube 40 is preferably set to ensure that the flow rate of the electrolyte passing through the communicating tube 40 is above a certain level. For example, the length L may be 15 m, or more preferably 10 m or less.

An inside diameter d of the communicating tube 40 may also be appropriately set. For example, the inside diameter d may range from 10 mm to 150 mm, or more preferably from 20 mm to 100 mm. The flow friction loss varies depending also on the inside diameter d of the communicating tube 40. That is, the smaller the inside diameter d, the greater the flow friction loss. Therefore, it is preferable to appropriately set the length L of the communicating tube 40 in accordance with the inside diameter d. Specifically, it is preferable to set the length L of the communicating tube 40 such that when a difference occurs between the volumes of the electrolytes 10P and 10N in the tanks 106 and 107, it takes 10 minutes (or 600 seconds) or less until the levels of the electrolytes 10P and 10N reach the same height. In this case, for example, the length L of the communicating tube 40 may be less than or equal to 100 times the inside diameter d (L 100d). Specifically, the length L may be 10 m or less if the inside diameter d is 100 mm, L may be 4.5 m or less if d is 50 mm, and L may be 1.7 m or less if d is 20 mm.

(Introducing Tube)

The RF battery 1 illustrated in FIG. 1 includes an introducing tube 50 configured to connect the positive electrolyte circulation path 120 to the communicating tube 40, and an open-close valve 51 configured to open and close the introducing tube 50. In this example, the introducing tube 50 is connected at one end thereof in such a manner as to branch off the supply pipe 108 of the positive electrolyte circulation path 120 and is connected at the other end thereof to the intermediate portion 43 of the communicating tube 40. Also, in this example, the supply pipe 108 has an open-close valve 69 downstream of its connection with the introducing tube 50 (i.e., located closer to the battery cell 100 than the connection is).

The introducing tube 50 and the open-close valve 51 are used to form a siphon, when the RF battery 1 starts, by filling the communicating tube 40 with electrolyte. Specifically, when the RF battery 1 starts, the open-close valve 51 is opened to start the pump 112, with the supply pipe 108 and the communicating tube 40 communicating with each other through the introducing tube 50, and circulate the positive electrolyte 10P through the communicating tube 40. This makes it possible to introduce the positive electrolyte 10P into the communicating tube 40 and fill the communicating tube 40 with the electrolyte. Then, with the communicating tube 40 being filled with the electrolyte, the open-close valve 51 closes the introducing tube 50 to block the flow between the supply pipe 108 and the communicating tube 40. This creates a liquid-tight state in the communicating tube 40 and thereby forms a siphon. After the RF battery 1 starts, the open-close valve 51 is always in a closed state during the operation.

When, for example, the communicating tube 40 is removed from the tanks 106 and 107 for maintenance of the RF battery 1, the pump 112 is stopped and the open-close valve 51 is opened. This terminates the siphon, causes the electrolyte in the communicating tube 40 to return to the tanks 106 and 107, and thereby facilitates the maintenance work. After the communicating tube 40 is removed from the tanks 106 and 107, the open-close valves 67 and 77 are closed to prevent air from entering the tanks 106 and 107 through the openings 64 and 74. This inhibits oxidation of the electrolytes 10P and 10N during the maintenance work.

Although the introducing tube 50 is connected and attached to the positive electrolyte circulation path 120 (supply pipe 108) in this example, the introducing tube 50 may be attached to the negative electrolyte circulation path 130 (supply pipe 109) or may be attached to both the circulation paths 120 and 130.

(Gas-Phase Communicating Tube)

The RF battery 1 illustrated in FIG. 1 includes a gas-phase communicating tube 45 that allows the gas-phase portions in the tanks 106 and 107 to communicate with each other. With the gas-phase communicating tube 45, it is possible to equalize pressures in the tanks 106 and 107. The gas-phase communicating tube 45 is stretched over the tanks 106 and 107. In this example, the gas-phase communicating tube 45 is connected to openings 65 and 75 at the tops of the tanks 106 and 107. The openings 65 and 75 are provided with open-close valves 68 and 78, respectively.

Advantageous Effects of Embodiment

The RF battery 1 according to the embodiment described above has the following operational advantages.

With the communicating tube 40, when a difference occurs between the volumes of the electrolytes 10P and 10N in the tanks 106 and 107 during operation of the RF battery 1, the levels of the electrolytes 10P and 10N can be automatically adjusted to the same level through the communicating tube 40 using the siphon principle. As described above, the intermediate portion 43 of the communicating tube 40 is disposed above the levels of the electrolytes 10P and 10N. Therefore, even if the communicating tube 40 is broken, the electrolyte in the communicating tube 40 is returned to either of the tanks 106 and 107 by termination of the siphon. Thus, even in the event of breakage of the communicating tube 40, it is possible to prevent the electrolyte in the communicating tube 40 from flowing out of the tanks 106 and 107. Additionally, since the openings 64 and 74 of the tanks 106 and 107 to which the communicating tube 40 is connected are located above the levels of the electrolytes 10P and 10N, the electrolytes 10P and 10N are prevented from leaking through the openings 64 and 74. Therefore, it is possible to effectively prevent the electrolytes 10P and 10N from flowing out of the positive electrolyte tank 106 and the negative electrolyte tank 107 while automatically adjusting the volumes of the electrolytes 10P and 10N in the tanks 106 and 107.

With the introducing tube 50 and the open-close valve 51, a siphon can be created by filling the communicating tube 40 with electrolyte when the RF battery 1 starts.

Since the open ends 41 and 42 of the communicating tube 40 are located on the bottom side in the tanks 106 and 107, gas bubbles are not easily drawn in through the open ends 41 and 42. This makes it easier to keep the communicating tube 40 in a siphon state.

Figure 4:
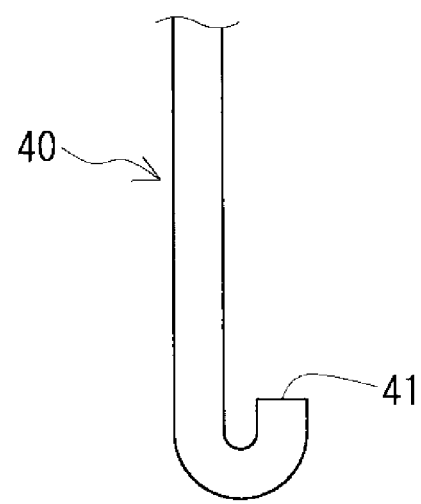
FIG. 4 illustrates a modified open end of the communicating tube included in the redox flow battery according to the embodiment.

As illustrated in FIG. 4, the communicating tube 40 may be bent into a J shape at both end portions thereof to allow the open ends 41 and 42 to face upward. In this case, gas bubbles are not easily drawn in through the open ends 41 and 42, and this makes it easier to maintain the siphon state.

Modifications of the RF battery 1 according to the aforementioned embodiment will now be described with reference to FIGS. 5 and 6.

[First Modification]

Figure 5:
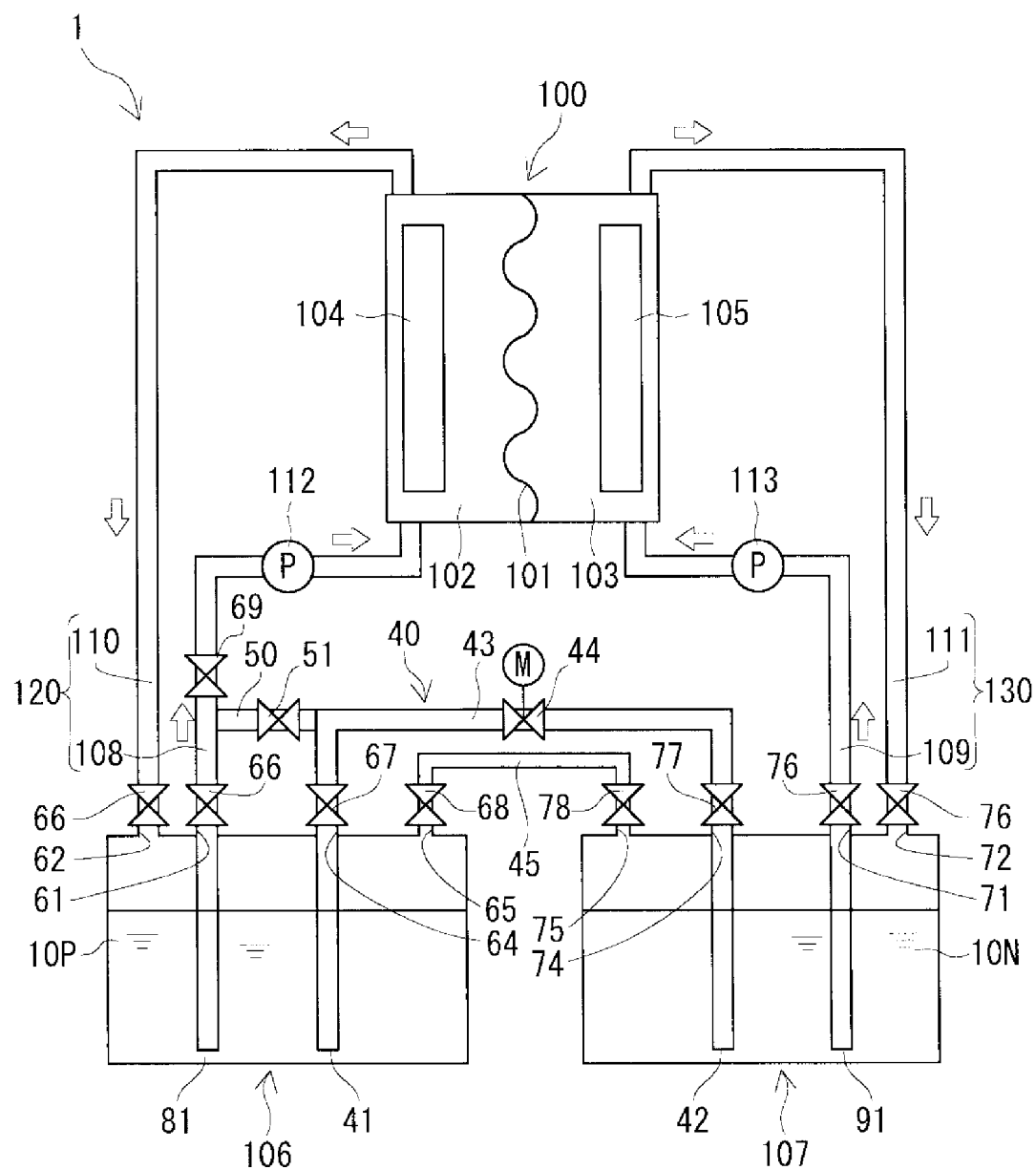
FIG. 5 is a schematic diagram of a redox flow battery according to a first modification.

The RF battery 1 according to a first modification illustrated in FIG. 5 differs from the aforementioned embodiment illustrated in FIG. 1 in that the communicating tube 40 is provided with a flow control valve 44. Other configurations of the first modification are the same as those of the aforementioned embodiment.

(Flow Control Valve)

The flow control valve 44 is disposed in the communicating tube 40 and configured to control the flow rate of the electrolyte passing through the communicating tube 40. In this example, as illustrated in FIG. 5, the flow control valve 44 is disposed in the intermediate portion 43 of the communicating tube 40. When, in the RF battery 1 of the first modification, the volumes of the electrolytes 10P and 10N in the tanks 106 and 107 are adjusted through the communicating tube 40, the flow rate (or the amount of transfer) of the electrolyte can be controlled by the flow control valve 44. In some cases, the transfer of the electrolyte may be stopped by closing the flow control valve 44. In this example, the flow control valve 44 is a motor-operated valve.

[Second Modification]

Figure 6:
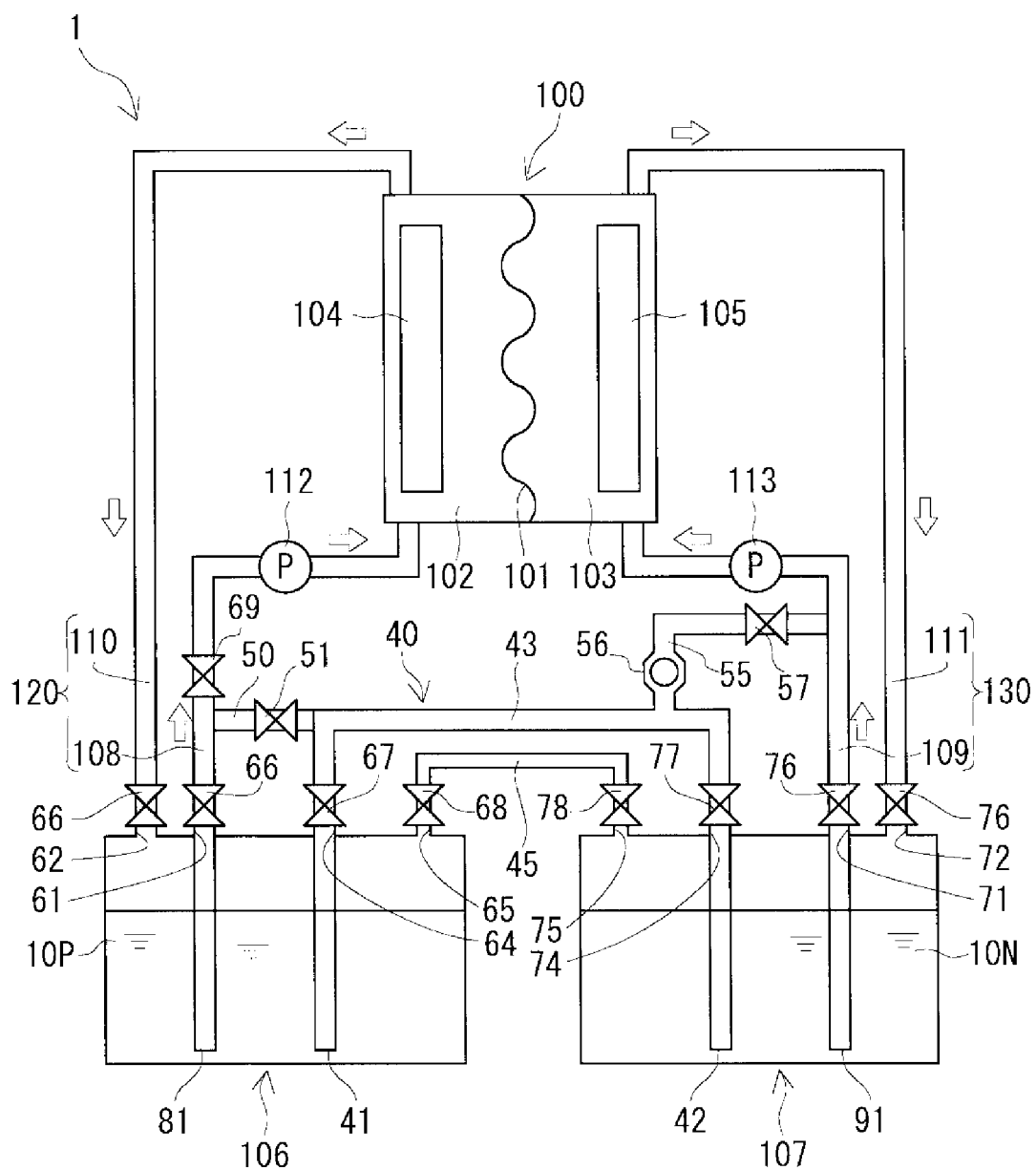
FIG. 6 is a schematic diagram of a redox flow battery according to a second modification.

The RF battery 1 according to a second modification illustrated in FIG. 6 differs from the aforementioned embodiment illustrated in FIG. 1 in that it includes a gas vent pipe 55 for allowing gas bubbles to escape from inside the communicating tube 40. Other configurations of the second modification are the same as those of the aforementioned embodiment.

(Gas Vent Pipe)

The gas vent pipe 55 is used to vent, from the communicating tube 40, gas bubbles accidentally drawn into the communicating tube 40. The gas vent pipe 55 is connected at one end thereof to the communicating tube 40 and connected at the other end thereof to at least one of the positive electrolyte circulation path 120 and the negative electrolyte circulation path 130. In this example, as illustrated in FIG. 6, the gas vent pipe 55 is connected at one end thereof to the intermediate portion 43 in such a manner as to branch off the communicating tube 40 and connected at the other end thereof to the supply pipe 109 of the negative electrolyte circulation path 130 in such a manner as to join the supply pipe 109. More specifically, the gas vent pipe 55 is connected at one end thereof to the top of the intermediate portion 43 and connected at the other end thereof to the supply pipe 109 at a location upstream of the pump 113 in the supply pipe 109 (i.e., closer to the tank 107 than the pump 113 is).

The gas vent pipe 55 is provided with a check valve 56. The check valve 56 is disposed in the gas vent pipe 55 and configured to block the circulation from the negative electrolyte circulation path 130 (supply pipe 109) to the communicating tube 40. Additionally, in this example, an open-close valve 57 is provided downstream of the check valve 56 (i.e., closer to the supply pipe 109 than the check valve 56 is). The open-close valve 57 is in an open state when gas bubbles are to be removed from the communicating tube 40, and is in a closed state when there is no need to remove gas bubbles from the communicating tube 40.

In the RF battery 1 of the second modification, if gas bubbles are accidentally drawn into the communicating tube 40, the gas bubbles accumulated in the communicating tube 40 can be vented through the gas vent pipe 55 to the negative electrolyte circulation path 130 (supply pipe 109) using suction by the pump 113. This allows the communicating tube 40 to be kept in a siphon state. With the gas vent pipe 55 having the check valve 56, even when the pump 113 is stopped and the supply pipe 109 is emptied, the entry of gas from the supply pipe 109 into the communicating tube 40 can be blocked. Therefore, even when the pump 113 is stopped, the communicating tube 40 is kept in a siphon state and the electrolyte in the communicating tube 40 is not returned into either of the tanks 106 and 107.

Additionally, by adjusting the degree of opening of the open-close valve 57, it is possible to control the flow rate of the electrolyte passing through the gas vent pipe 55 and prevent the electrolyte from accidentally flowing out of the communicating tube 40 into the supply pipe 109. Specifically, suction by the pump 113 causes the electrolyte to be fed little by little through the gas vent pipe 55 and the communicating tube 40 to the supply pipe 109, so that gas bubbles accumulated in the communicating tube 40 are efficiently removed. When the communicating tube 40 is removed, for example, for maintenance of the RF battery 1, the entry of air into the supply pipe 109 is prevented by closing the open-close valve 57.

Application of Embodiment

The redox flow battery according to the embodiment can be used for load leveling, compensation for instantaneous voltage drop, emergency power supply, and smoothing of the output of natural energy-based power generation (e.g., solar or wind power generation) which has been introduced at a large scale.

REFERENCE SIGNS LIST

1: redox flow battery (RF battery)
2: cell stack
3: cell frame
31: bipolar plate
32: frame body
32o: recessed portion
33, 34: liquid supply manifold
35, 36: liquid discharge manifold
33s, 34s: liquid supply slit
35s, 36s: liquid discharge slit
37: sealing member
40: communicating tube
41, 42: open end
43: intermediate portion
44: flow control valve
45: gas-phase communicating tube
50: introducing tube
51: open-close valve
55: gas vent pipe
56: check valve
57: open-close valve
61, 71: outlet
62, 72: inlet
64, 74: opening
65, 75: opening
66, 67, 68, 69, 76, 77, 78: open-close valve
81, 91: open end
100: battery cell
101: membrane
102: positive electrode cell
103: negative electrode cell
104: positive electrode
105: negative electrode
106: positive electrolyte tank
107: negative electrolyte tank
108, 109: supply pipe
110, 111: return pipe
112, 113: pump
120: positive electrolyte circulation path
130: negative electrolyte circulation path
10P: positive electrolyte
10N: negative electrolyte
200: substack
210: supply/drainage plate
220: end plate
230: fastening mechanism

The invention claimed is:

1. A redox flow battery comprising:
a battery cell;
a positive electrolyte tank and a negative electrolyte tank configured to store therein a positive liquid electrolyte and a negative liquid electrolyte, respectively;
a positive electrolyte circulation pipe and a negative electrolyte circulation pipe each configured to allow a corresponding one of the liquid electrolytes to circulate between a corresponding one of the tanks and the battery cell;
a communicating tube including a tube having one open end thereof fully immersed in the positive liquid electrolyte, an intermediate portion thereof stretched above levels of both the liquid electrolytes, and the other open end thereof fully immersed in the negative liquid electrolyte;
an introducing tube separate from the positive and negative electrolyte circulation pipes and configured to connect at least one of the positive electrolyte circulation pipe and the negative electrolyte circulation pipe to the communicating tube; and
an open-close valve configured to open and close the introducing tube.

2. The redox flow battery according to claim 1, wherein the open ends of the communicating tube are each located on a bottom side in a corresponding one of the tanks.

3. The redox flow battery according to claim 1, wherein the open ends of the communicating tube are formed to face upward.

4. The redox flow battery according to claim 1, wherein the communicating tube is provided with a flow control valve.

5. The redox flow battery according to claim 1, further comprising a gas vent pipe configured to allow gas bubbles to escape from inside the communicating tube, wherein the gas vent pipe is connected at one end thereof to the communicating tube and connected at the other end thereof to at least one of the positive electrolyte circulation pipe and the negative electrolyte circulation pipe.

6. The redox flow battery according to claim 1, wherein the introducing tube directly connects at least one of the positive electrolyte circulation pipe and the negative electrolyte circulation pipe to the communicating tube.

7. The redox flow battery according to claim 1, wherein the introducing tube has a first end located on the communicating tube and a second end located on at least one of the positive electrolyte circulation pipe and the negative electrolyte circulation pipe.

* * * * *